United States Patent
Spartz

(10) Patent No.: US 8,267,045 B2
(45) Date of Patent: *Sep. 18, 2012

(54) SYSTEM AND METHOD FOR AQUACULTURE OF MARINE LIFE FORMS

(76) Inventor: Karen R. Spartz, Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,586

(22) Filed: Aug. 24, 2011

(65) Prior Publication Data

US 2012/0048202 A1 Mar. 1, 2012

Related U.S. Application Data

(63) Continuation of application No. 12/336,603, filed on Dec. 17, 2008, now Pat. No. 8,006,645.

(60) Provisional application No. 61/015,929, filed on Dec. 21, 2007.

(51) Int. Cl.
*A01K 61/00* (2006.01)
(52) U.S. Cl. ........................ 119/223; 119/227
(58) Field of Classification Search .......... 119/223, 119/204, 205, 207, 215–218, 226–229, 232–236, 119/248, 259–264, 266; 220/573.1; 210/167.21, 210/167.23, 167.24, 416.2
See application file for complete search history.

(56) References Cited

U.S. PATENT DOCUMENTS

| | | | |
|---|---|---|---|
| 1,976,159 A | 10/1934 | Bridge | |
| 3,155,609 A | 11/1964 | Pampel | |
| 3,669,075 A | 6/1972 | Marsh | |
| 4,080,929 A | 3/1978 | Millnitz | |
| 4,395,970 A | 8/1983 | Kunkle et al. | |
| 4,903,636 A | 2/1990 | Kroeker | |
| 5,704,313 A | 1/1998 | Gibbs | |
| 5,782,204 A | 7/1998 | Rahn | |
| 5,836,265 A | 11/1998 | Barber et al. | |
| 5,921,203 A | 7/1999 | Gibbs | |
| 5,967,088 A | 10/1999 | Lin | |
| 6,539,894 B1 * | 4/2003 | Byrne et al. | |
| 6,578,523 B2 * | 6/2003 | Gagnon | 119/234 |
| 7,748,349 B2 | 7/2010 | Thorvardarson et al. | |
| 2006/0112895 A1 | 6/2006 | Olivier et al. | |
| 2008/0216757 A1 | 9/2008 | Tseng | |

* cited by examiner

*Primary Examiner* — Rob Swiatek
*Assistant Examiner* — Ebony Evans
(74) *Attorney, Agent, or Firm* — Woodard, Emhardt, Moriarty, McNett & Henry LLP

(57) ABSTRACT

Disclosed is a system for aquaculturing marine life forms such as coral utilizing a rotating tray that exposes the marine life forms to variable water flow conditions during each revolution of the tray.

20 Claims, 13 Drawing Sheets

SYSTEM AND METHOD FOR AQUACULTURE OF MARINE LIFE FORMS

CROSS REFERENCE TO RELATED APPLICATIONS

This application is a continuation of U.S. Utility Patent Application, Ser. No. 12/336,603, filed on Dec. 17, 2008 now U.S. Pat. No. 8,006,645, application Ser. No. 12/336,603 claims the benefit of U.S. Provisional Patent Application No. 61/015,929 filed on Dec. 21, 2007.

BACKGROUND

The present disclosure is related to a system and method for agriculture of marine life forms.

Growing demand for live ocean products, in particular reef products, particularly living resources such as coral, fish and other marine life forms have made commercial exploitation of natural coral reefs a growing international concern. The U.S. imports of dead coral materials such as material used for jewelry and curios are relatively stable. However, commerce in live coral, live rock and live marine life forms have increased dramatically in the United States in recent years.

To a substantial extent this increased demand is due to approximately one million aquarium hobbyists who live in the United States. It has been estimated that Americans buy approximately eighty-percent (80%) of live coral taken from reefs and more than ninety-percent (90%) of all live rock in trade. As the United States either prohibits or strictly regulates the harvest of reef building corals and live rock in most federal, state and territorial waters import represents the almost exclusive supply to the U.S. market for these kinds of reef resources.

In spite of improved aquarium technology and handling practices it has been estimated that ninety-percent (90%) of some of the most popular species of marine life that are collected from reefs die before or soon after they reach aquarium owners in the U.S. Collections of corals for the aquarium and jewelry industries typically target a small number of rare slow growing and long-lived species (often selected for some unusual characteristic). Over harvesting of these and other reef species can cause localized destruction of reefs, increased erosion, loss of fish habitat and yet further increased demand for these rare species located on other reefs. Looking forward, there is a growing international concern over these matters that could result in increased regulation of the trade of live marine resources, particularly those taken from reefs around the world. As the demand for such products by the hobbyists in the U.S. is not likely to abate, it is foreseen that there will be an increased demand for domestically aquacultured marine life forms to supply the hobbyist market.

Furthermore, there are perceived advantages to aquacultured marine life forms as compared to wild specimens. For example, many wild-collected fishes have difficulty adjusting to living in a limited volume environment wherein aquacultured fish have been reared in a limited volume environment so they have no need to adjust to that aspect of captivity. Similarly, wild specimens are accustomed to vigorous competition for space and light and have potent strategies for claiming their living areas. Conversely, aquacultured specimens of the same species often are more docile and tolerant of their neighbors.

Another potential advantage to aquacultured marine life forms is they are not exposed to the many varied parasites and infectious diseases as compared to wild specimens.

However, aquaculture of coral and other reef species have proven to be difficult and expensive in many instances. Many of these species are adapted to very specific ecological niches in the coral reef ecosystem. Similarly, many reef species require specific environmental conditions to grow and survive. Similarly, many reef species are particularly susceptible to some water contaminates that can be found in significant concentrations in fresh water supplies but are found in much lower concentration in ocean waters.

DETAILED DESCRIPTION OF THE DRAWINGS

Figure 1:
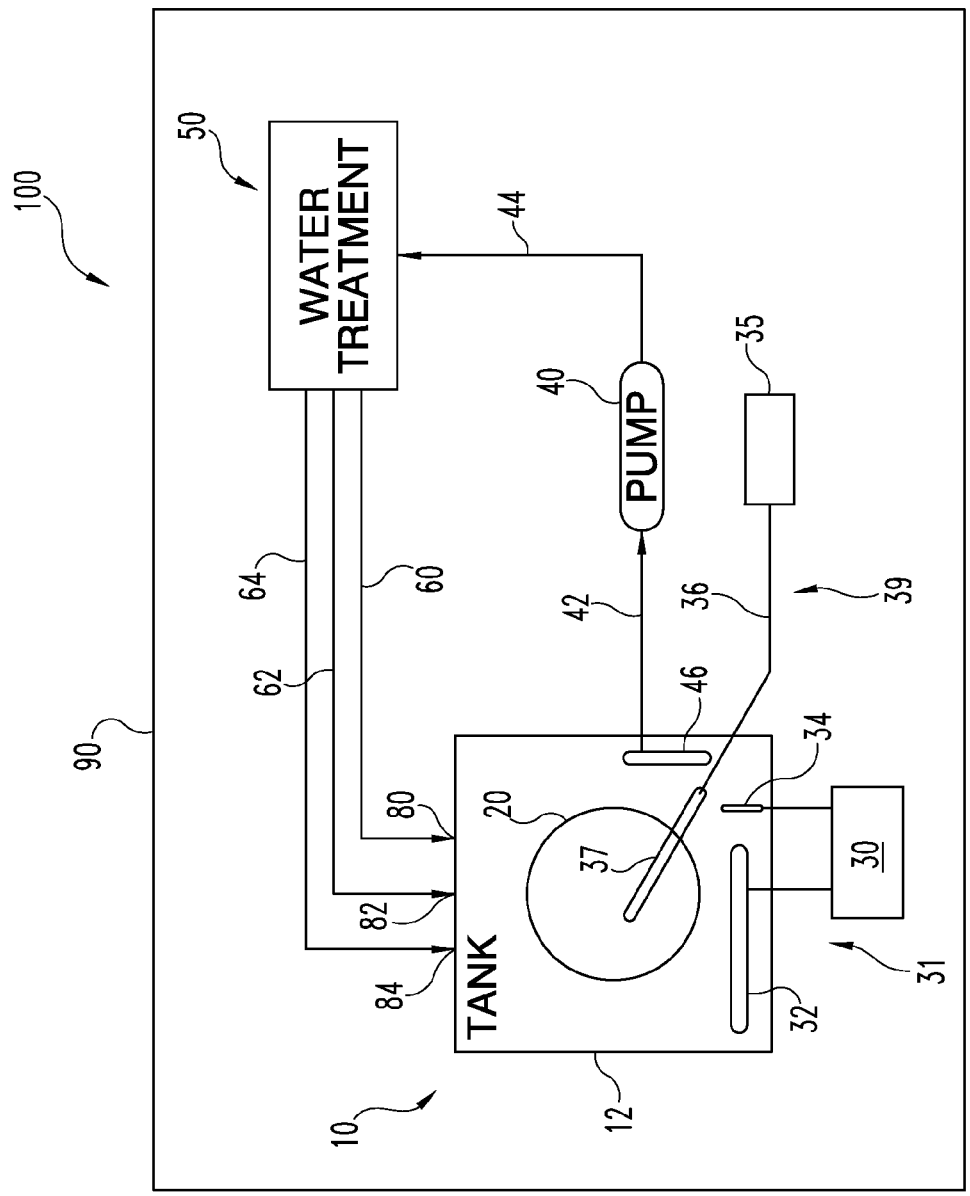
FIG. 1 is a diagram of a system for aquaculture of marine life forms.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several figures, where there are the same or similar elements, those elements are designated with similar reference numerals.

FIG. 1 depicts aquarium system 100 which generally comprises habitat 10, rotating tray 20, pump 40 and water treatment 50.

Aquaculture system 100 is intended to provide a habitat that is adapted for the particular specie(s) of marine life form(s) being aquacultured therein. Specifically regarding life forms that naturally occur on coral reefs, these life forms are accustomed to environmental conditions that may not be easily replicated in a stagnant tank located outside of the ocean. For example, many corals, both hard and soft species, have adapted to having water flow across them when waves wash over the coral while heading in then the individual coral observes water motion in the opposite direction as waves recede. Similar effects can also be created by tides rising and falling, generating mass movement of water across coral reefs. In addition, coral reefs are generally located in the warmer climates in the worlds' oceans and many of the marine life forms that live on coral reefs are accustomed to particular water temperatures and light exposures that may not be available in northern latitudes such as those found in the United States.

Accordingly, aquaculture system 100 includes several features intended to replicate some of the characteristics of the habitat that the marine life forms to be aquacultured may be accustomed to. Specifically regarding habitat 10, habitat 10 includes water tank 12, rotating tray 20, temperature control unit 31 and aerator 39. Temperature control unit 31 includes heater 32, thermometer 34 and heat controller 30.

Aerator 39 includes bubble wand 37, air line 36 and air pump 35. While temperature control unit 31 and aerator 39 are depicted within water tank 12, it is contemplated that temperature control unit 31 and aerator 39 could be located anywhere in system 100, including, but not limited to, in water treatment 50 or in the water flow passageways between habitat 10 and water treatment 50. In one embodiment, temperature control unit 31 includes heater 32 as a 3,000-unit marine tank heater that maintains the temperature at 78° F.

The water in habitat 10 generally requires some conditioning to suit the requirements of the species living therein. Such conditioning can include, for example, removing undesirable material from the water (filtration), monitoring the level(s) of particular parameters (for example, alkalinity, calcium, pH, magnesium, nitrates etc.), and supplementing the water to replace resources used by the marine life being grown therein (food, calcium, etc.). In system 100, this is accomplished, at least in part, in water treatment 50, where water is transferred from habitat 10 to water treatment 50 utilizing pump 40 and the illustrated connection lines. Water from habitat 10 is removed from water tank 12 at filter 46. Water passes through supply line 42 to pump 40 where the water is pumped to habitat 50 through output line 44.

While water conditioning occurs in water treatment 50, it should also be appreciated that water conditioning could occur elsewhere. For example, as described below, in a natural system, it is possible to include various life forms that have symbiotic relationships wherein the byproduct of one life form is consumed by another. Other lifeforms can be selected to consume unwanted constituents, for example, herbivorous marine surgeonfish consume nuisance algae. Similarly, the fill materials utilized in habitat 10 (as described in greater detail below) can dissolve elements into the water, such as calcium, that are subsequently consumed by life forms in habitat 10, such as coral. Such a natural based system can significantly reduce the degree of conditioning required in water treatment 50.

In any event, when the water is in water treatment 50, it can be filtered and/or conditioned as necessary to accommodate the aquatic life located in habitat 10. Water treatment 50 can utilize artificial water treatment techniques and/or biological water treatment techniques (otherwise known as natural treatments) to condition the water. Artificial water treatment techniques may include technologies such as ultraviolet sterilization, carbon or chemical filtration, mechanical filtration, reverse osmosis (RO), deionization (DI), calcium additives, calcium reactors, calcium testing and control, protein skimming (foam fractitioners), ozonizers, phosphate reactors, fluidized sand bed filtration, chemical dechlorination, pH testing and control, alkalinity testing and control, nitrate testing and control, nitrite testing and control and ammonia testing and control, proprietary water conditioners and additives, such as trace elements, by way of example and as are known in the art.

After treatment, water is returned to tank 12 via output lines 60, 62 and 64 by gravity feed. Output lines 60, 62 and 64 enter tank 12 at outlets 80, 82 and 84. As described below, outlets 80, 82 and 84 can be strategically located in and around tank 12 to generate desirable water current conditions in tank 12. By way of example, one or more outlets 80, 82 and 84 can be positioned such that the outlet flow encourages rotation of rotating tray 20 inside tank 12.

Water treatment 50 is located above tank 12 to facilitate gravity feed of water from water treatment 50 to habitat 10. In one embodiment, water treatment 50 is located approximately 14-16 inches above tank 12.

Lines 42, 44, 60, 62 and 64 can consist of hard pipe, flexible tubing or any other water conduit desired. It may be advantageous to use opaque piping or tubing to reduce the occurrence of aquatic life forms, such as algae, growing inside these lines. In this regard, significant algae growth has been encountered when using translucent tubing for these lines inside a greenhouse, as described below.

System 100 optionally includes bubble wand 37, connected to air pump 35 by air line 36. In one embodiment, bubble wand 37 is a 4-foot long commercially available bubble wand. Other embodiments may utilize other length and/or configurations of bubble wands/pads.

As discussed below, tray 20 may be constructed of styrene lighting panels to permit water and gas to pass through tray 20. In some embodiments, significant algae growth has been encountered that fills the holes in tray 20 sufficiently to block circulation of water and gas through tray 20 resulting in anaerobic conditioning under tray 20. Locating bubble wand 37 under tray 20 in system 100 may provide a source of oxygen under tray 20. In addition, bubbles 38 released from bubble wand 37 may reduce the accumulation of algae on tray 20, improving water and gas circulation through tray 20.

The components described above in system 100 are located in greenhouse 90. Placing the components of system 100 inside greenhouse 90 may provide a relatively inexpensive environment that can be advantageous to the growth and development of the aquatic life forms being aquacultured. Greenhouse 90 permits utilization of energy from the sun in the form of light and heat. Light is required by many forms of aquatic life for growth and maintenance of a specific water temperature range is essential for the growth and development of many life forms, including those native to coral reefs. While heat and light can be artificially generated, the cost of artificially generating heat and light, both in terms of component costs and energy usage, can substantially increase overhead costs required to aquaculture marine life forms. However, it is contemplated that artificial light and heat sources could be used in conjunction with greenhouse 90 to tailor and/or supplement the conditions in greenhouse 90 as appropriate. In addition, supplementing heat and/or light may be advantageous during the winter months in areas lying in more northerly latitudes, as during the winter, shorter days may not provide sufficient sunlight for some life forms.

Conversely, during many summer months, environmental conditions in a greenhouse can raise the temperature of the water in habitat 10 above that which is desirable for the growth and development of the life forms therein. While not illustrated in system 100 (or systems 110 or 120 described infra), several methods can be used to reduce the temperature of the water in habitat 10. For example, it is possible to incorporate a heat exchange system utilizing cooled water wherein water that is artificially cooled by either a cooling tower or a water chiller can be used via a heat exchanger to reduce the temperature of water 14 in habitat 10. Another solution that has been used with success is freezing water that is acceptable for the conditions in habitat 10 and introducing the frozen water in the form of ice cubes or ice chunks and reducing the temperature 14 in habitat 10 by the melting of such ice cubes or ice chunks. Yet another solution is use of fans directed across the surface of the water in habitat 10 to increase the amount of evaporative cooling. Greenhouses also typically include ventilation structures to allow the dissipation of excess heat during hot times. However, such dissipation is generally limited by the outside environmental conditions that the greenhouse is in.

Generally regarding system 100 (and subsequently described systems 110 and 120), there are several considerations important to the selection of individual components to be used therein. For systems used to aquaculture coral (and many other marine life forms), it is essential that all individual components used in system 100, 101 and/or 102 be selected to prevent the introduction of contaminates in habitat 10 that could be harmful to the life forms, being aquacultured. In particular, many metal oxides, for example, iron oxide and copper oxide, are toxic to many species of coral and fish. Given the corrosive nature of salt water, it is generally advisable to avoid use of any component containing any traces of metal in locations that come in contact with such salt water.

Figure 2:
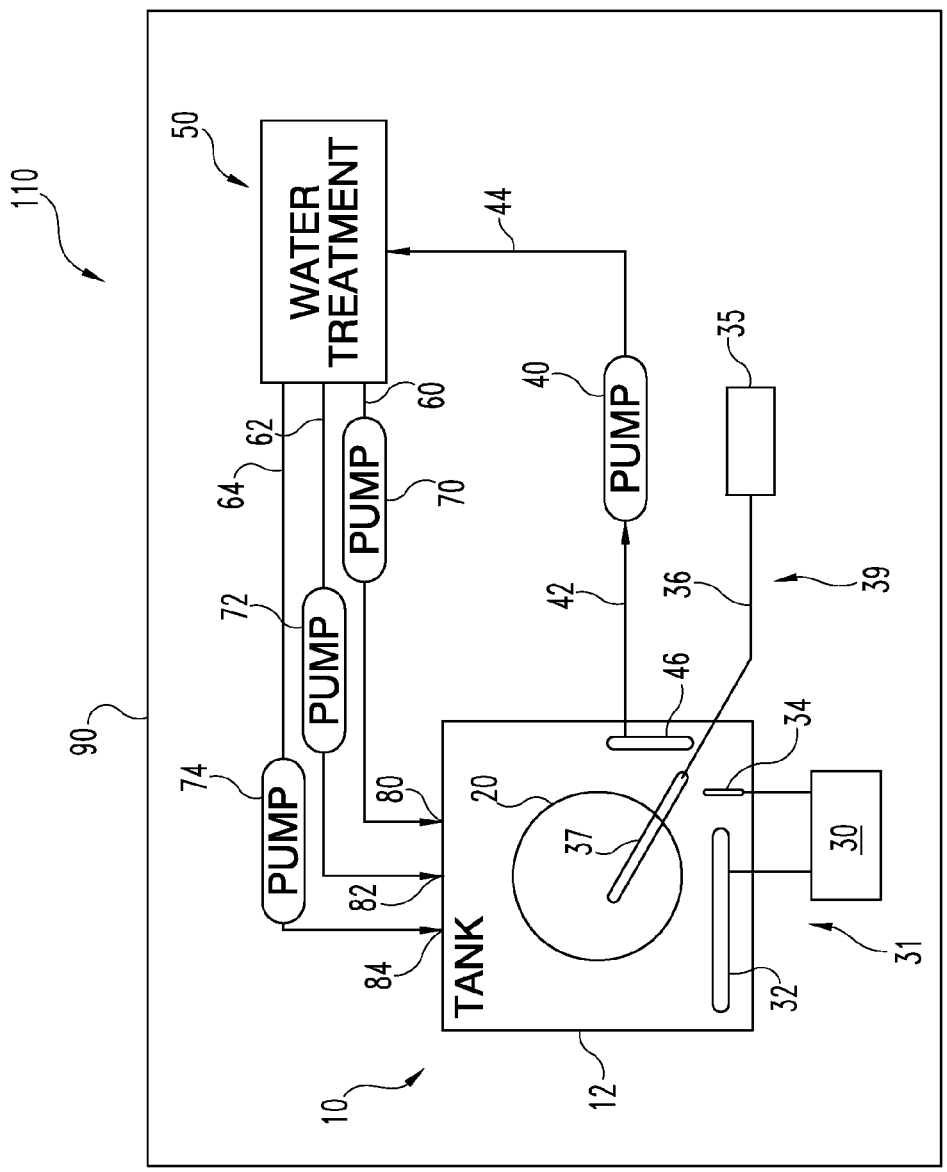
FIG. 2 is a diagram of an alternative system for aquaculture of marine life forms.

Referring to FIG. 2, aquaculture system 110 is illustrated. Aquaculture 110 shares many similar components as aquaculture system 100. The primary difference being that the water flow from the water treatment 50 to tank 12 through pump 70, 72 and 74. Pump 70 is located on output line 60 and supplies water flow to outlet 80. Pump 72 is located on output line 62 and supplies water to outlet 82. Pump 74 is located on outlet line 64 and supplies water to pump outlet 84. Aquaculture system 110 may be beneficial in situations when water flow greater than can be achieved through gravity feed is desirable to create water flows that the aquatic life being aquacultured is accustomed to. Similarly, in other situations, it may be beneficial to locate water treatment 50 remotely from water tank 12 or at a level at or below water tank 12 in which case pumps 70, 72 and 74 provide a means for transferring water between water treatment 50 and water tank 12.

Figure 3:
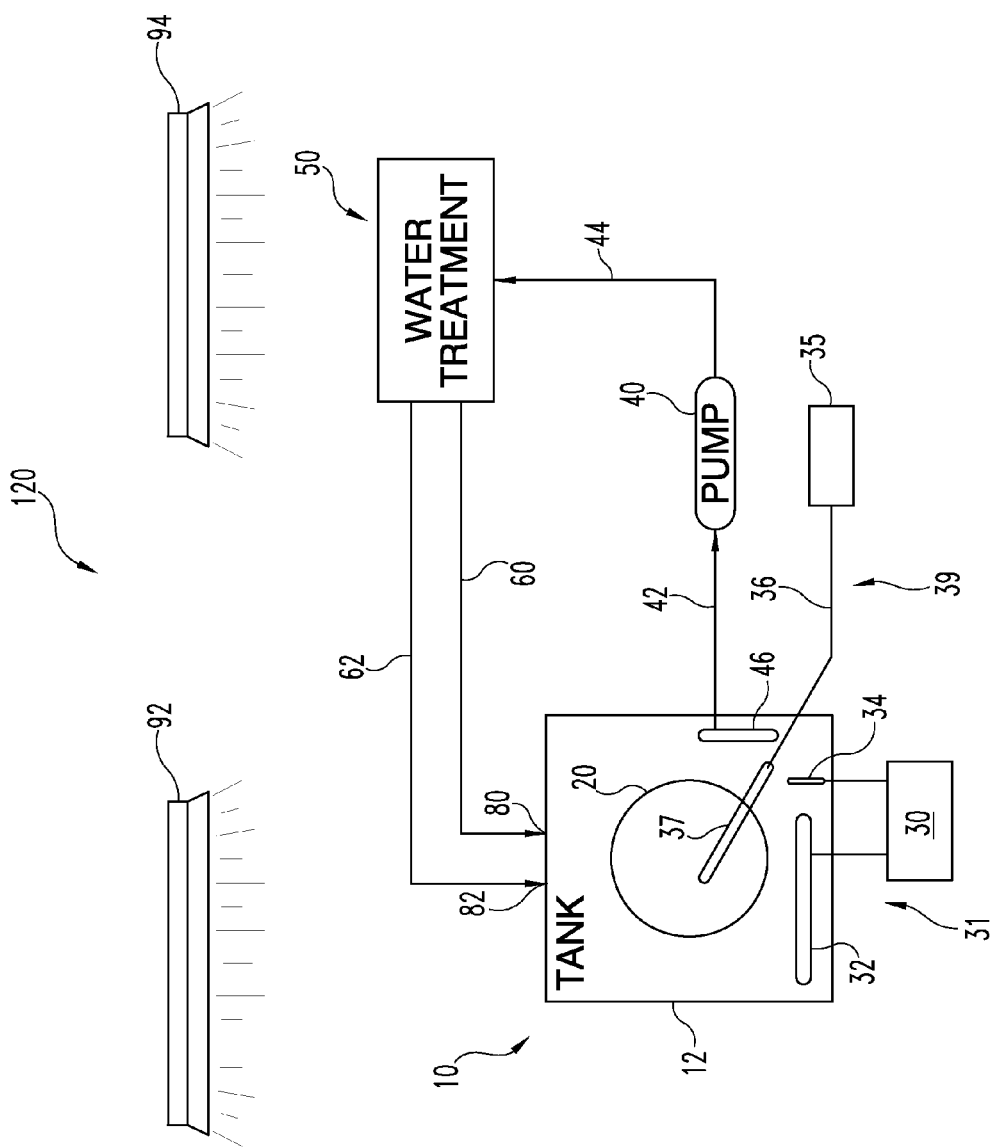
FIG. 3 is a diagram of an alternative system for aquaculture of marine life forms.

Referring now to FIG. 3 aquaculture system 120 is illustrated. Once again, aquaculture system 120 shares many common components with aquaculture systems 100 and 110. However, aquaculture system 120 only includes two output lines 60 and 62 between water treatment 50 and tank 12. In addition, aquaculture system 120 includes light sources 92 and 94. In particular, light source 92 is located over tank 12 and light source 94 is located over water treatment 50. In this regard, as described below, in some embodiments, a natural filtration system utilizing macroalgae may be utilized. In those cases, water treatment 50 may require a light source to promote growth of the required macroalgae and/or any other life forms in water treatment 50. Similarly, in situations where natural lighting is not available or insufficient lighting is available, then light source 92 may be utilized to provide the light energy required by the aquatic life forms being aquacultured. In this regard, it is contemplated that the use of light source 92 and/or 94 can be used in conjunction with greenhouse 90 or may be used separately as the situation dictates.

Also regarding the use of light sources 92 and 94, individual aquatic life forms being aquacultured may be accustomed to different light wave lengths and intensities based on the individual aquatic life form. In particular, aquatic life forms adapted to deeper water depths may prefer different wave lengths and intensity of light than life forms adapted to shallower depths. In this regard, light sources 92 and/or 94 can be adapted to provide the intensity and wave length of light required for individual species of aquatic life forms being aquacultured, as is known in the art.

Figure 4:
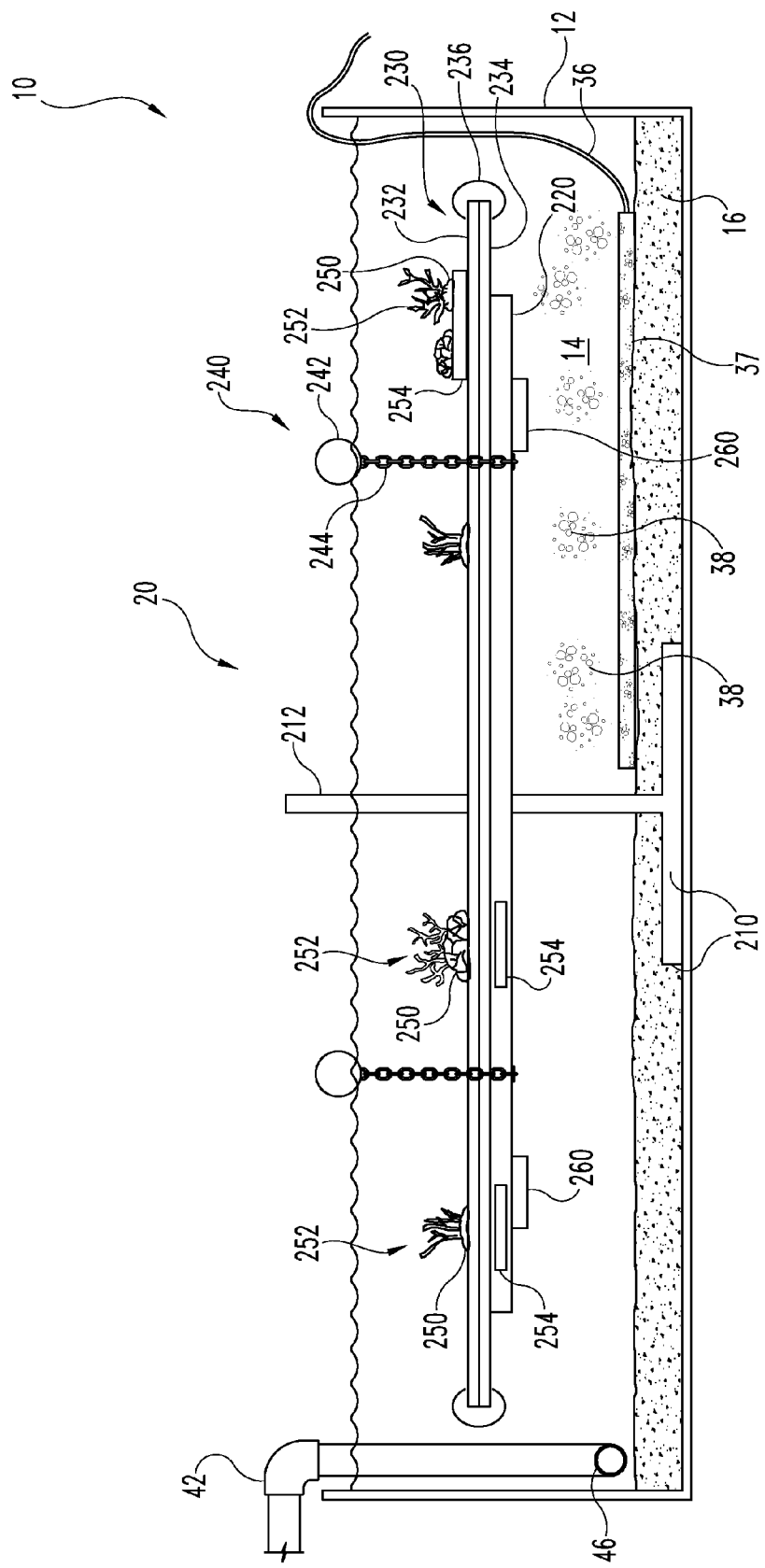
FIG. 4 is an embodiment of an aquaculture tank habitat, one component depicted in FIGS. 1-3.

Referring now to FIG. 4, one embodiment of habitat 10 is illustrated in a side view. In the illustrated embodiment, habitat 10 is located in water tank 12 filled with water 14. In one embodiment, tank 12 is a 650 gallon, ridged vinyl, round stock tank, 8' in diameter, 2' deep. Water 14, for most sea based life forms, is salt water. However, it is contemplated that the systems and methods described herein can be used with brackish and/or fresh water aquatic life forms and thus the salinity characteristics of water 14 can be adapted for specific aquatic life forms being aquacultured.

The bottom of tank 12 is covered with a layer of fill 16. Fill 16 may include a variety of live rocks, live sand, live rubble and sand. In many cases it is beneficial to use a combination of various sizes of live rocks and live sand. The use of live rock and sand may help regulate the level of calcium carbonate in water 14. In addition, live rock and sand often contain other organisms that naturally occur in reef environments. These organisms can increase the overall biodiversity in habitat 10 and are beneficial in many configurations of systems 100, 110 and 120. In any event, the particular composition of fill 16 can be selected based upon the life forms being aquacultured.

Located in habitat 10 is rotating tray 20 which may hold many of the individual aquatic life forms being aquacultured. Rotating tray 20 includes base plate 210 with center support 212. As illustrated, base plate 210 is located underneath fill 16 to provide stability and support. In other embodiments, base plate 210 can be located on top of fill 16 or partially buried in fill 16, as desired. In the illustrated embodiment, base plate 210 and center support 212 can be repositioned by moving center support 212. In other embodiments base plate 210 could be affixed to the bottom of water tank 12.

The rotating portion of rotating tray 20 is tray 230 and tray frame 220 which are located around center support 212 as detailed further herein. Tray 230 rotates about center support 212 to provide water flow(s) to the life forms being aquacultured thereon. The depth of tray 230 below the water line is regulated by depth regulator 240. In the illustrated embodiment depth regulator comprises float 242 and chain 244. The actual depth of tray 230 in the illustrated embodiment is controlled by the length of chain 224 and the overall weight on tray 230.

In this regard, the aquatic life forms in the illustrated embodiment are hard and soft corals. In particular, life forms 252 are attached to mounts 250. In one embodiment, mounts 250 are smooth landscaping eggrock. Mounts 250 may be rocks, live rocks, concrete plugs or other mounting materials as known in the art which would be suitable for the individual life form 252 being mounted thereon. Mounts 250 are located in various locations along tray 230. Underneath each mount 250 may be located a float 254. One purpose of float 254 is to balance tray 230 to achieve near neutral buoyancy. Achieving near neutral buoyancy situation allows easier rotation of tray 230. Floats 254 may be any positively buoyant material such as styrofoam, air filled pocket or any other positively buoyant material known in the art. Due to their positive buoyancy, floats 254 can advantageously be located in gaps in tray frame 230 without use of any additional securing means. In other embodiments it is contemplated that floats 254 could be secured to tray 230 or tray frame 220.

Other details of rotating tray 20 include edge guard 236 placed around the outer edge of tray 230. In the illustrated embodiment tray 230 is comprised of tray top 232 and tray bottom 234, each of which may be constructed of light styrene lighting panels (some times referred to as "egg-crate").

The round shape may be cut from sections of two foot by four foot lighting panels and assembled to create an approximately circular shape. Two layers of the styrene lighting panels may be utilized to increase strength and stability. Edge guard 236 may be used to protect the aquatic life forms being aquacultured in tank 12, including but not limited to live fish, from any sharp edges that may result from the manufacturing of tray 230. In one embodiment, edge guard 236 is a piece of ¾ quarter inch clear plastic vinyl tubing slit to fit over the outside edges of tray 230 and placed around the circumference of tray 230 then strapped to tray 300 with plastic cable ties (not illustrated). Other embodiments of tray 20 can utilize perforated material.

Rotating tray 20 may also optionally include one or more paddles 260 located on the underside of tray frame 220. As discussed below, in some embodiments, the flow of water may be directed towards the underside of rotating tray 20 to generate the rotational movement of rotating tray 20. In those embodiments it may be advantageous to add one or more paddles 60 to tray frame 220 to increase the ability of tray 20 to be rotated by water stream located underneath of rotating tray 20. Other embodiments could incorporates paddles 260 on the top of tray 20 (not illustrated).

Another embodiment of tray 20 (not illustrated) includes one or more sail like structures attached to small uprights attached to rotating tray 20 where the sail like structure extends above the water line of water 14. Such an embodiment permits the use of an external fan or blower wind source to power the rotation of rotating tray 20. Such an embodiment may be beneficial when aquaculturing life forms sensitive to direct water flow.

Habitat 10 also includes filter 46 and supply line 42 which supplies water to pump 40 as illustrated in FIGS. 1-3. In the illustrated embodiment, filter 46 is a small piece of PVC pipe with holes drilled in it ¾ the way around the diameter with the bottom not having any holes. The holes are arranged in columns down the length of pipe. One side of filter 46 includes an end cap and the other side may include an adapter to be attached to a hose or pipe. The drilled holes are wrapped with a nylon screen material and secured with one or more plastic ties.

Filter 46 is intended to spread the intake of water over a larger surface area by utilizing multiple small intakes. This potentially eliminates the creation of a vortex that has been observed utilizing a single large intake. Such a vortex can be hazardous to more mobile life forms such as fish and invertebrates that have the potential to get trapped in the filter.

Figure 5:
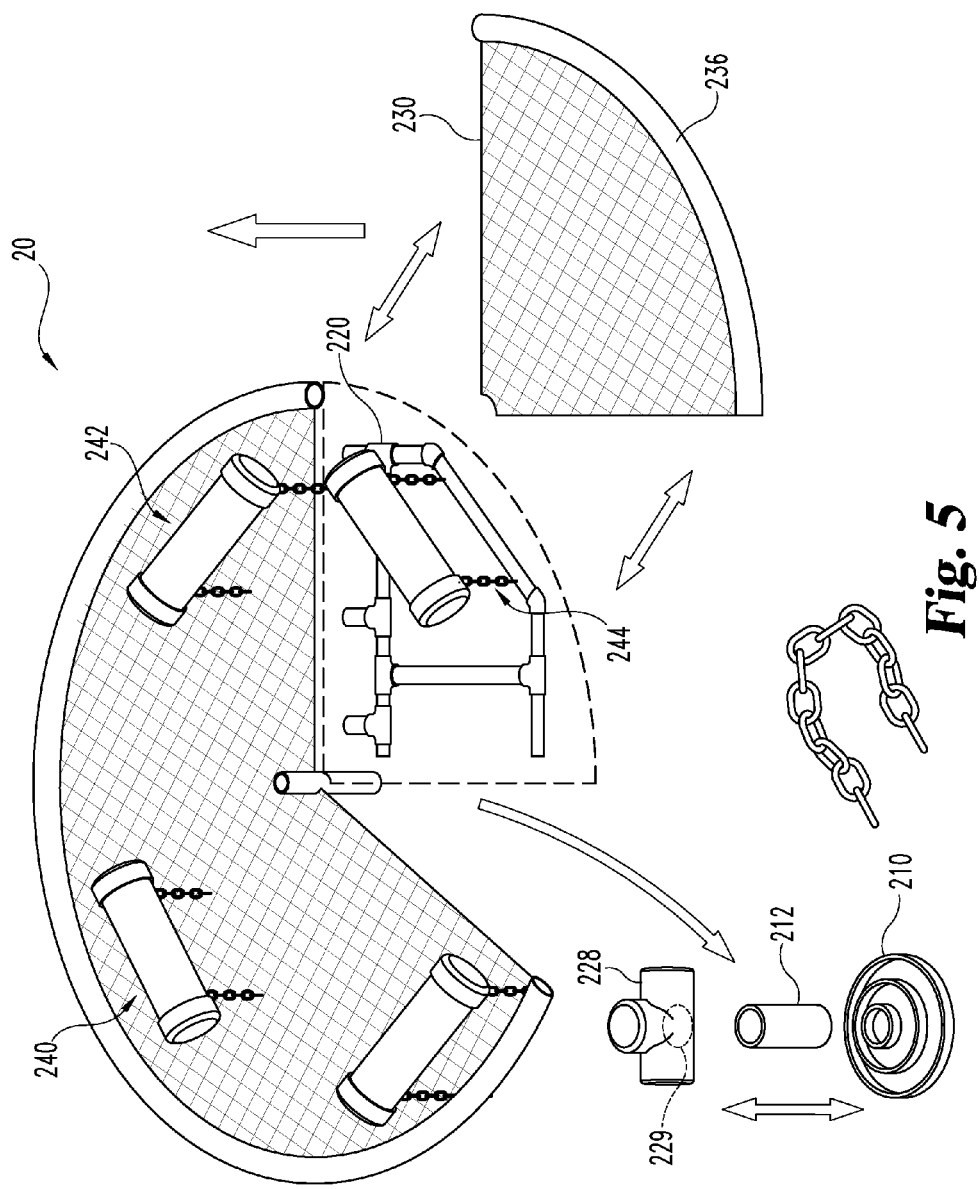
FIG. 5 depicts a particular embodiment of a rotating tray, one component depicted in FIGS. 1-4.

Referring now to FIG. 5 an embodiment of rotating tray 20 is illustrated including several details of the construction and assembly of the illustrated embodiment. Tray frame 220 is illustrated located beneath tray 230 tray frame 220 is comprised of a series of PVC pipe segments as will be discussed in greater detail herein. Attached to tray frame 220 are chains 244 which connect floats 242 to tray frame 220 (and tray 230 above). Floats 242, in the illustrated embodiment, are comprised of approximately 18-inch lengths of 4-inch PVC pipe sealed with end caps. In one embodiment, chains 244 are attached so that the top surface of tray 230 is approximately 6-8 inches below the surface of the water in the tank. Other depths can be selected as desired for particular organisms being aquacultured.

Tray frame 220 is connected to center support 212 through bushing 228. In the illustrated embodiment, bushing 228 comprises a PVC pipe T-joint with hole 229 drilled therein sufficient for bushing 228 to pass center support 212 and revolve thereon. Hole 229 should accordingly be large enough to pass easily over center support 212 but tight enough to fix the center point of rotating tray 20 securely without unnecessary slope. Alternative embodiments can utilize different configurations of bushing 228, including, but not limited to a cross type fitting.

Figure 6:
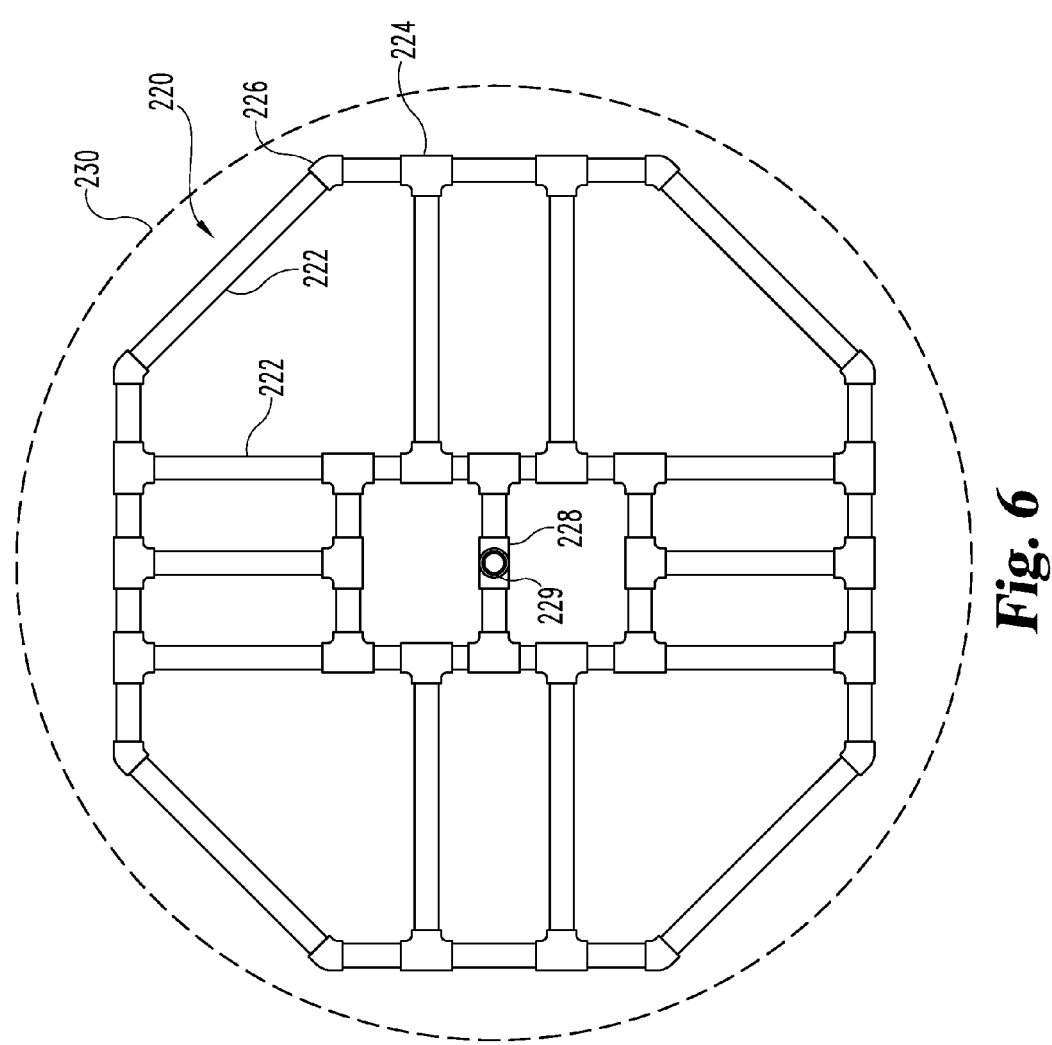
FIG. 6 depicts one embodiment of a tray frame, one component depicted in FIGS. 4-5.

Referring now to FIG. 6 tray frame 220 is illustrated in greater detail. Tray frame 220 is constructed of a plurality of pipe members 222, T-joints 224 and 45 degree elbow joints 226 and, as described above, at the center of tray frame 220 is located bushing 228 having hole 229. In the illustrated embodiment, pipe members 222 are constructed from segments of 1¼ inch PVC pipe with T-joint 224, 45-degree elbow joint 226 and bushing 228 also being appropriately sized 1¼ inch pieces. Pipe members 222 are cemented into T-joint 224 and 45 elbow joint 226 and bushing 228 using standard PVC cement as known in the art.

Also illustrated in FIG. 6 is a rough overlay of tray 230 marked in the dash line of the outer periphery of tray frame 220 to illustrate the general relationship between the size of tray frame 220 as compared to tray 230. In one embodiment, tray 230 is approximately six (6) feet in diameter.

Referring now to FIGS. 7-11, illustrated are several top down views of water tank 12 showing potential positioning of outlets 80, 82 and 84. In general, rotating tray 20 in the present disclosure permits simulation of various water flow conditions as may be beneficial to different life forms 252. Many life forms that occur naturally on coral reefs are adapted to receiving water flow from multiple directions. For example, when a wave comes in, the life forms observe a current in one direction and when a wave recedes, the life forms may receive a current in a different, perhaps opposite, direction. It has been found that for many life forms 252, it is beneficial for them to experience currents moving in multiple directions. The exact speed of current and the degree of difference in flow required for each life form 252 vary upon the individual characteristics and natural habitat conditions of particular life forms 252. Rotating tray 20 and habitat 10, as described herein, permit multiple flow configurations such that the flow conditions can be adapted as may be desired for individual life forms 252.

Figure 7:
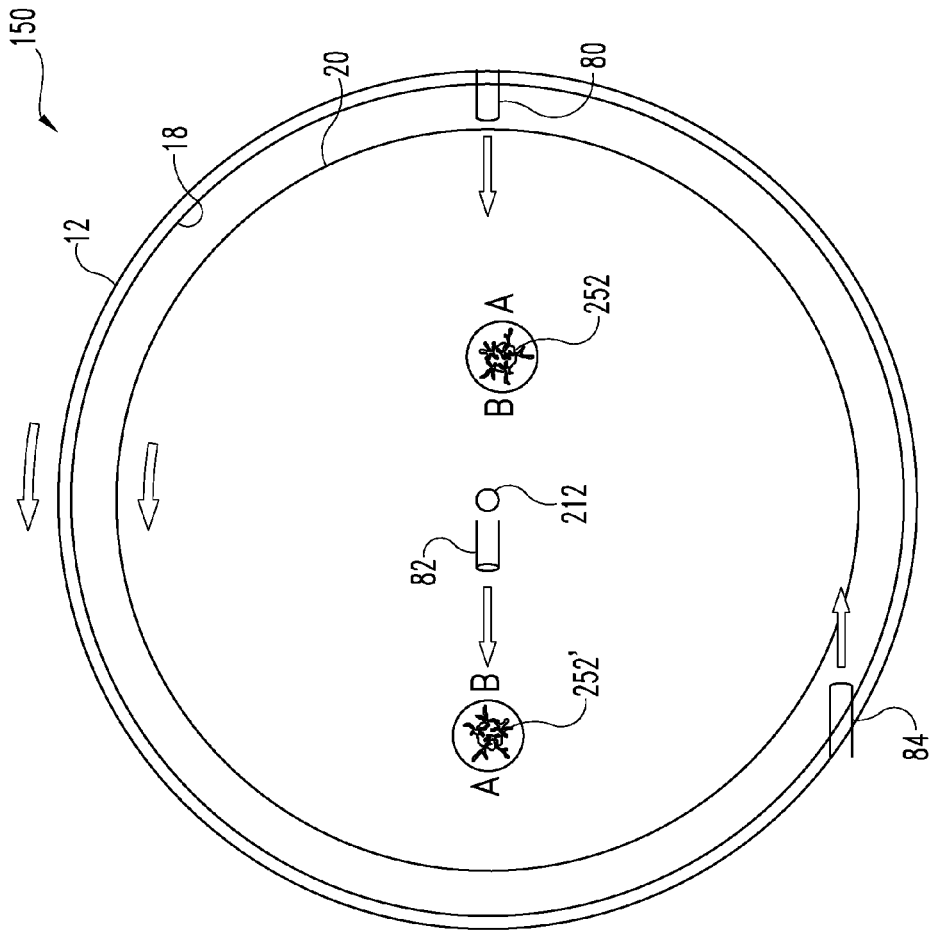
FIG. 7 illustrates a tank water flow configuration of the systems depicted in FIGS. 1-3.

Referring specifically to FIG. 7, flow configuration 150 is illustrated. Flow configuration 150 includes 3 outlets 80, 82 and 84 as illustrated. Outlet 80 is located approximate to the side of tank 12 directed approximately towards center support 212. Outlet 82 is located approximate to center support 212 directed in the same general direction as outlet 80 is directed. In the illustrated embodiment both outlet 80 and 82 are directed from the right to the left. Outlet 84 is located inside of tank 12 near sidewall 18 and is directed nearly tangentially towards the periphery of rotating tray 20. Outlet 84 is directed to generate a flow across tray 20 to generate the desired rotation of tray 20 about center support 212. In this regard, outlet 84 is also directed slightly downward towards the tray 20 such that the water flowing from outlet 84 flows directly upon tray 20 to impart some portion of the momentum of the flow into tray 20. The actual location of outlet 84 can be varied as necessary to control the rotational speed of tray 20 as well as the location on tray 20 where the greatest flow from outlet 84 is experienced.

Regarding outlet 82 and other outlets described herein that are positioned away from sidewall 18, pipe construction using only PVC between outlet 82 and water treatment 50 can be used to locate outlet 82 over tank 12. Alternatively, outlet 82 can be affixed to center support 212 or otherwise supported using other structures.

Outlets 80, 82 and 84 are depicted in FIGS. 7-11 as relatively concentrated water flows. In some embodiments, this may be accurate as outlets 80, 82 and/or 84 could be nozzles or pipe or hose exits. In other embodiments, outlets 80, 82 and/or 84 could generate comparatively wider and/or slower/gentler water flows. The flow characteristics of outlets 80, 82 and 84 can be individually tailored to generate desired water flow characteristics.

As illustrated, flow configuration 150 may replicate the wave washing action described above that life forms may experience on a coral reef. In this particular example, life form 252 is illustrated in two positions as represented by life form 252 and 252'. The sides of life form 252 are indicated as A and B. In the first position, life form 252 experiences a flow originating from outlet 80 crossing side A. As tray 20 rotates approximately 180 degrees life form 252 as marked by life form 252' experiences a flow from outlet 82 directed across side B or in the opposite direction as experienced by life forms 252 in the first location. This may replicate flow conditions that would be experienced in natural conditions.

Other water flow conditions can be created by tray 20. As tray 20 is rotating, life forms will experience cross flow from the water in the tank as tray 20 moves comparatively faster than the water in the tank. Conversely, as the life forms approach outlet 84 they may experience a water flow in a substantially opposite direction as outlet 84 accelerates tray 20 with water flowing at a comparatively greater speed. In this regard, it is possible to create multiple flow conditions on rotating tray 20 depending upon the location of outlet 84 (and outlets 80 and 82) and the relative locations of each life form 252. Thus, life forms that may thrive in higher flow conditions may benefit by placing them in a location where they will experience more direct flow from outlet 84. Conversely, for life forms that may not tolerate the higher flow conditions, there may be locations on wheel 20 that receive comparatively less flow where such life forms could be located.

It should also be understood that while three outlets are illustrated that a fewer or a greater number of outlets can be used depending on the specific flow conditions that are desired. Thus, more outlets could be used to generate different flow conditions and the relative flow speed from each outlet can be varied. As will be described further herein, it is contemplated that as few as one or two outlets could be used in some embodiments.

In general, it should also be understood that outlets 82 and 84 could be from any of the aquaculture systems 100, 110 or 112 described above. Thus, the outlets could be supplied with water gravity fed from the water treatment or from a pump at whatever speed is desired.

Also, wherein flow configuration 150, as is described, places outlet 84 above rotating tray 20, it is also contemplated that outlet 84 could be located beneath rotating tray 20 and be directed towards the underside of rotating tray 20 where tray frame 220 (not illustrated) may be located. This permits flow conditions where life forms 252 would not directly experience the flow from outlet 84 and provides yet another option to customize the flow conditions for individual life forms.

Figure 8:
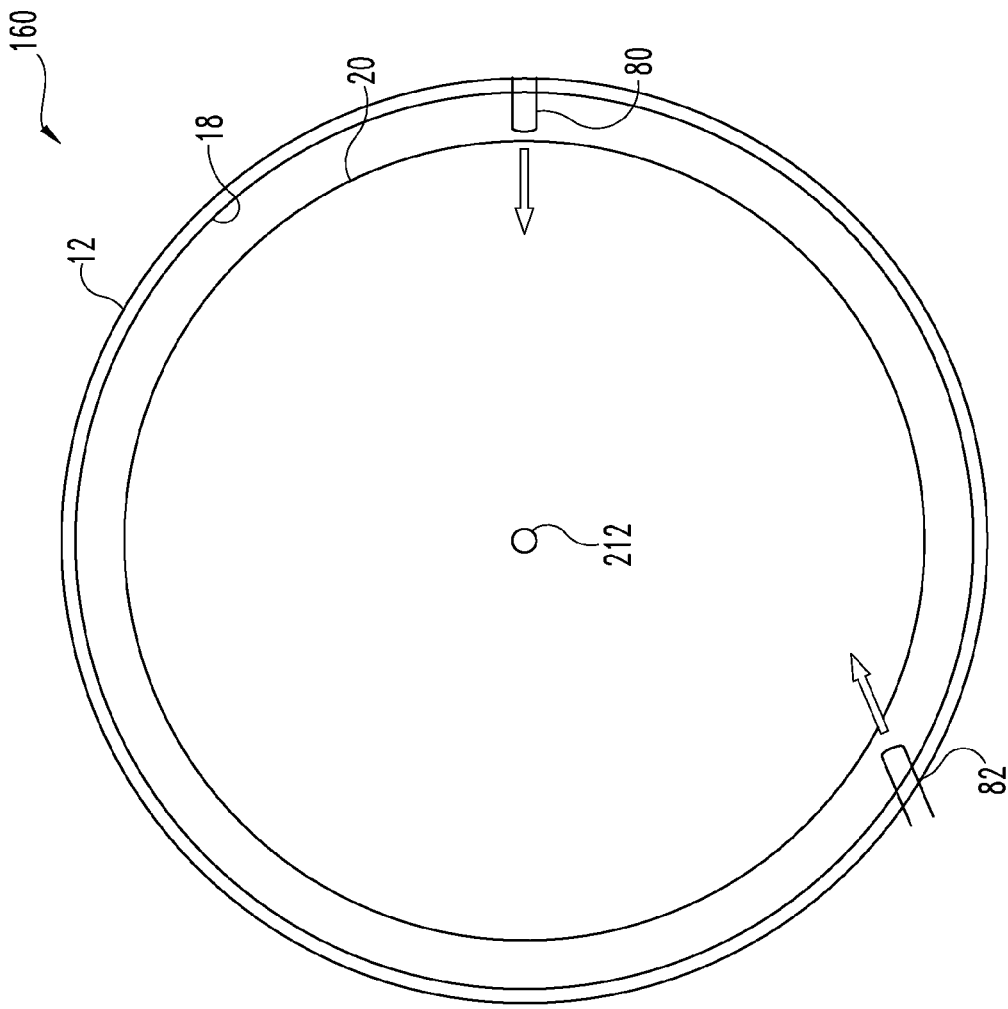
FIG. 8 illustrates an alternative tank water flow configuration of the systems depicted in FIGS. 1-3.

Referring now to FIG. 8 flow configuration 160 is illustrated. Flow configuration 160 utilizes but two outlets, outlet 80 and 82, to generate the desired flow condition. In this regard outlet 80 is illustrated near sidewall 18 and once again being directed generally towards center support 212. Outlet 82 is also located near sidewall 18 inside water tank 12 and is directed approximately 30 degrees off tangent from the rotating tray 20 towards the center areas of rotating tray 20. Once again, outlet 82 could be located either above or below rotating tray 20 and outlet 82 is generally angled downwards or upwards of rotating tray 20 to impart a rotational current onto rotating tray 20 as described above.

Flow configuration 160 may generate a variable flow by at least two mechanisms. The first, as described above, as the rotating wheel 20 passes outlet 82, life forms will experience water flow in one direction. As the life forms revolve away and rotating tray 20 is turning faster than the water, the life forms will experience a flow in substantially the opposite direction. Secondly, similar to above, life forms on the tray will experience flow from outlet 80 in one direction then as they rotate 180 degrees, a residual current from outlet 80 on the opposite side of wheel 20 is then experienced in the opposite direction.

Figure 9:
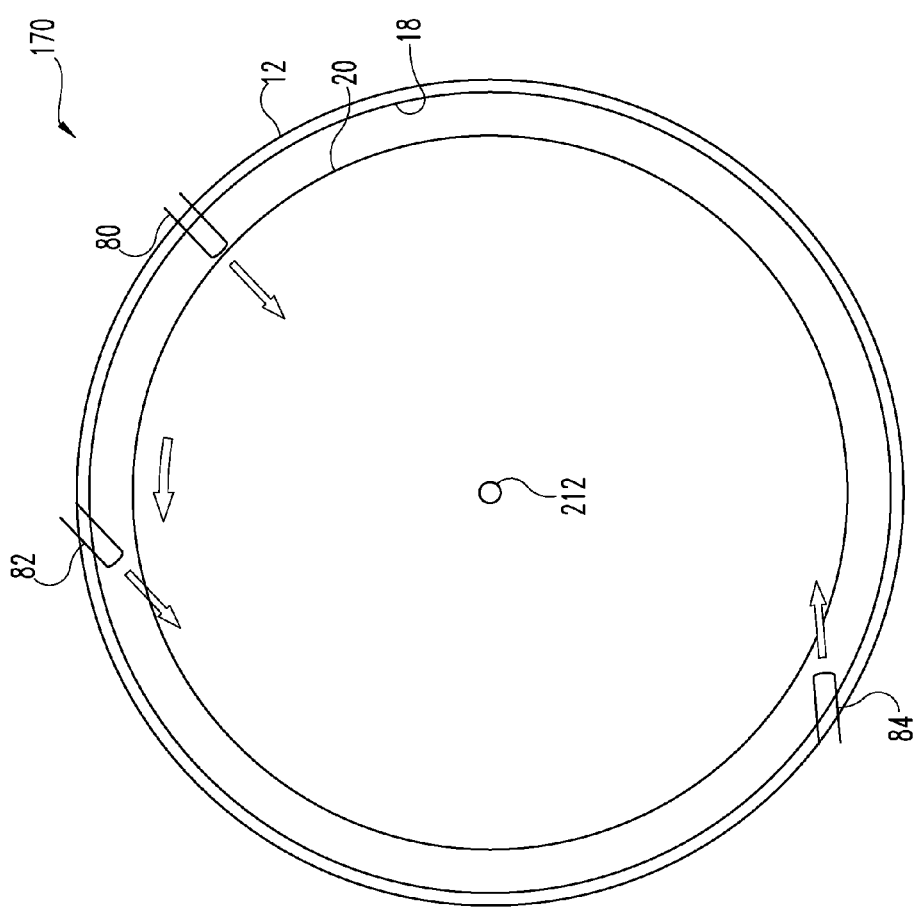
FIG. 9 illustrates an alternative tank water flow configuration of the systems depicted in FIGS. 1-3.
Figure 10:
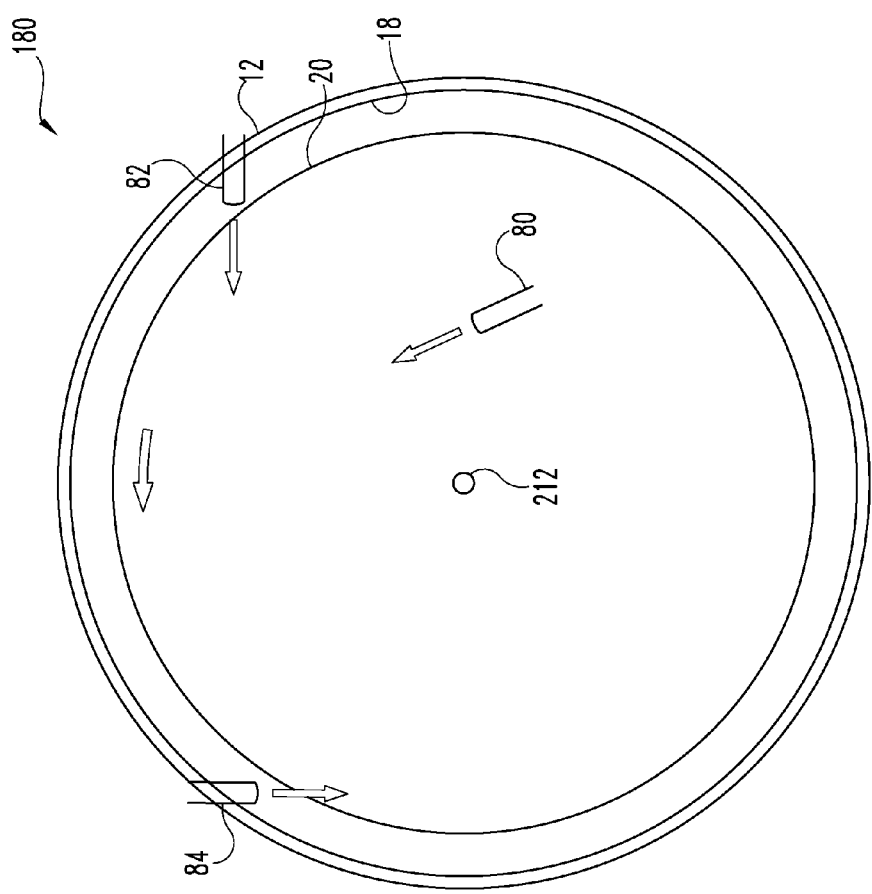
FIG. 10 illustrates an alternative tank water flow configuration of the systems depicted in FIGS. 1-3.

Referring now to FIGS. 9-10, flow configurations 170 and 180 are illustrated. Both flow configurations 170 and 180 utilize two outlets, in particular outlet 82 and 84 directed angularly in a generally tangential manner towards the edge of wheel 20 as described above in flow configurations 150 and 160. Flow configuration 170 utilizes outlet 80 directed approximately towards center support 212 located in the center of tray 220. Flow configuration 180 positions outlet 80 approximately towards the middle of tray 20 between center support 212 and the edge of tray 20 directed in a generally tangential direction along the direction of rotation of tray 20. Configurations 170 and 180 provide additional alternatives to tailor the flow conditions for habitat 10 to suit the needs of particular life forms 252.

Figure 11:
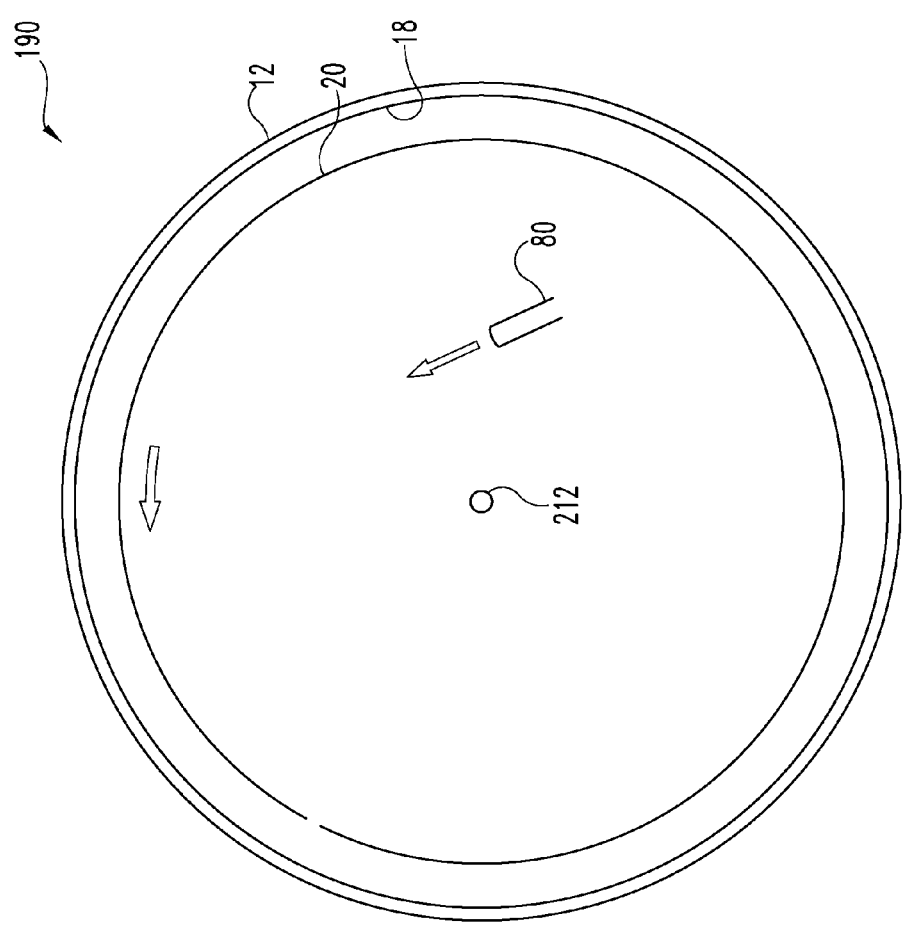
FIG. 11 illustrates an alternative tank water flow configuration of the systems depicted in FIGS. 1-3.

Referring to FIG. 11, flow configuration 190 is illustrated using a single outlet 80 positioned between center support 212 and the edge of tray 20 and directed in a generally tangential direction along the direction of rotation of tray 20. As tray 20 rotates in flow configuration 190, life forms will experience cross flow from the water in the tank as tray 20 rotates comparatively faster than the water in the tank. Then, as the life forms passes outlet 80, they may experience a water flow in a substantially opposite direction as the water flow from outlet 80 flows at a comparatively greater speed.

Figure 12:
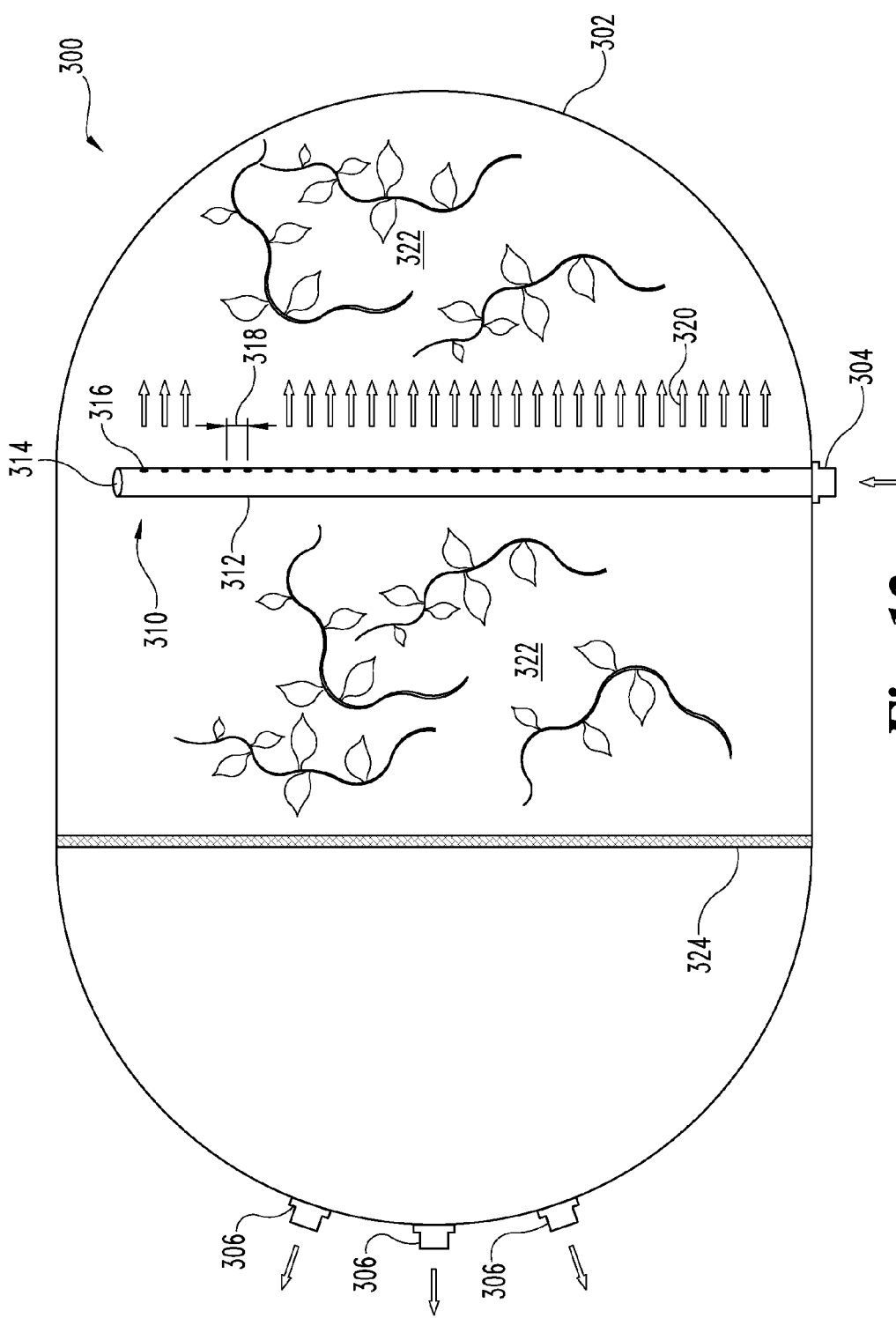
FIG. 12 depicts a top view of one embodiment of water treatment system, a component depicted in FIGS. 1-3, utilizing a biological filtration process.
Figure 13:
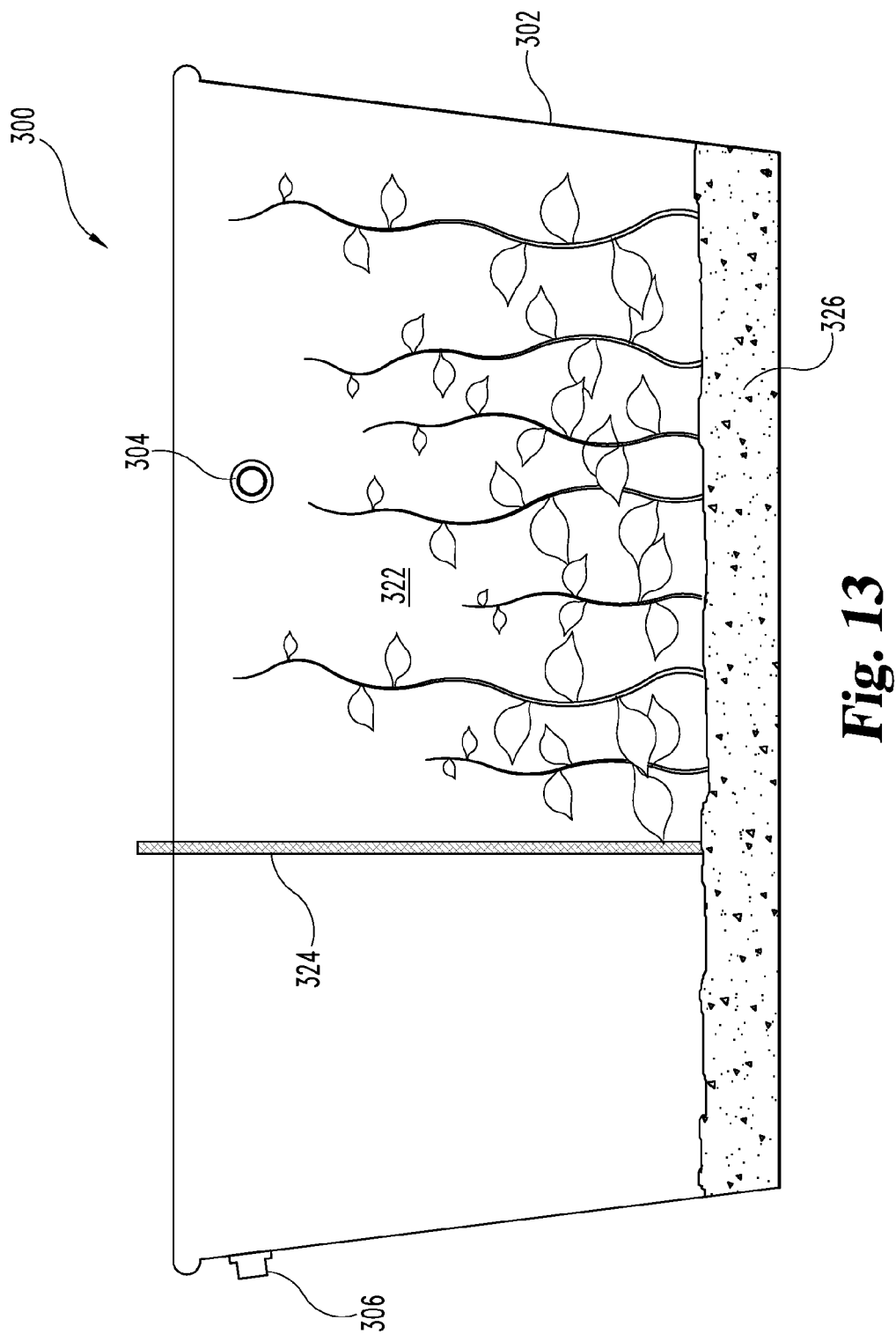
FIG. 13 depicts a side view of the water treatment system depicted in FIG. 12.

Referring to FIGS. 12-13, one embodiment of water treatment 50 is illustrated as refugium 300. Refugium 300 uses natural filtration and biologic organizing to process water 14.

Referring specifically to FIG. 12, refugium 300 comprises tank 302 having inlet 304 and one or more outlets 306. Spray bar 310 is connected to outlet 304 and generates inlet flow 320 to refugium 300 in a direction roughly opposite from outlet(s) 306. Tank 302 also contains screen 324 between spray bar 310 and outlets 360.

On the side of screen 324 opposite of outlets 306, tank 302 contains filter medium 322. In the illustrated embodiment, filter medium 322 is macro-algae (seaweed). Other embodiments can utilize any other known filter mediums known in the art.

Spray bar 310 comprises pipe 312, cap 314 and holes 316 spaced apart by hole spacing 318. The spray bar 310 preferably provides relatively uniform flow along its length. This can be achieved in several ways. In the illustrated embodiment, holes 316 are approximately the same size but hole spacing 318 is varied such that in the regions of pipe 312 closest to inlet 304, hole spacing 318 is comparatively greater than hole spacing 318 located closer to cap 314. In one embodiment, hole spacing 318 is gradually reduced as individual holes 316 are located further from inlet 304. In other embodiments, a specific pattern of holes spacing 318 can be utilized.

An alternate embodiment of spray bar 310 has substantially consistent hole spacing 318 while holes 316 have variable diameters, wherein holes 316 closest to inlet 304 are comparatively smaller than holes 316 located closer to cap 314.

The specific configuration of spray bar 310 is dependent upon the actual flow rates desired. For example, the flow rates determine the diameter of spray bar 310 and the length of spray bar 310. In the illustrated embodiment, spray bar 312 is constructed of an 1¾ PVC pipe with individual holes 316 being approximately 7/32 of an inch in diameter with hole spacing 316 starting out at approximately ⅛ of an inch near cap 314 and to hole spacing of approximately one inch approximate to inlet 304.

Regarding screen 324, screen 324 serves to retain filter medium 322 inside of refugium 300 and away from outlet(s) 306. Thus, the configuration of screen 324 is dependent, at least in part, on the characteristics of filter medium 322. In the embodiment described herein utilizing macro-algae as filter medium 322, ½ inch styrene lighting panels can be utilized. (The same styrene lighting panels utilized as described above for tray top 232 and tray bottom 234.) These styrene lighting panels utilized for screen 324 has square openings approximately ½ inch width and height. However, as described above, the individual screen material 324 should be selected based upon the characteristics of filter medium 322 utilized herein.

The number of outlets 306 can be equal to the number of output lines 60, 62 and 64. In the illustrated embodiment, tank 302 is 100-gallon agricultural tank drilled and fitted with 1-inch bulkheads positioned as illustrated for outlets 306 and inlet 304. In aquaculture systems, such as systems 100 and 120, where gravity feed is utilized to flow water between refugium 300 and habitat 10, refugium 300 is elevated approximately 14-16 inches above water tank 12 to permit discharge from refugium 300 into water tank 12 by gravity flow. The specific height differential can be adjusted to achieve different water flow rates.

Referring now to FIG. 13, a cross section side view of the refugium 300 is illustrated. Depicted in FIG. 13 is live fill 326. In the illustrated embodiment utilizing a 100-gallon tank, approximately 200-300 pounds of live rock and live sand creates a 4-5 inch deep layer of live fill 326. This depth may be sufficient to generate anaerobic conditions near the bottom of live fill 326 to provide an additional filtering mechanism in refugium 300.

Wherein a natural filtration system has been described in FIGS. 12-13, it is also possible to artificially condition water 14 to provide the water characteristics required by individual life forms 252. For example, a reverse osmosis system and deionization system can be used in conjunction to remove any impurity from a water supply providing otherwise pure water. The required levels of individual minerals and other constituents can be measured and supplemented in this water supply to provide any desired water characteristic needed in an aquaculture system described herein.

It is also possible to create desirable water characteristics using natural means that require little or no human intervention. In some of the embodiments illustrated herein, habitat 10 contains a wide variety of natural organisms in addition to any life forms 252 that may be aquacultured for commercial sale. Habitat 10 can contain live sand and live rock and life forms from phytoplankton, zooplankton, invertebrates and fish. Each life form can be specifically chosen to perform a specific function. For example, a particular fish may eat a particular type of algae that needs to be controlled. Phytoplankton and zooplankton may serve as food sources to life forms 252 and the live rock and live sand may support the life of the lower life forms that subsequently support life forms 252 that are being aquacultured. While habitat 10 can be optimized to produce coral structures by replicating reef conditions, these conditions may also be advantageous to cultivate different fish species that also thrive in reef like conditions. Cultivation of fish may also be beneficial to the cultivation of some types of coral as the coral can consume some bi-products that are generated by many fish. Thus, habitat 10 can be tailored to create a natural ecosystem including lower life forms and higher life forms that are all interdependent upon each other and, when kept in balance, create beneficial conditions for all of the life forms to thrive.

Although much energy is derived from natural sunlight, supplemental feeding of the tank fauna is also utilized. Feeding consists of adding generous portions of purpose-made frozen food approximately every three days. Such feeding can occur both in habitat 10 and water treatment 50 (in embodiments in which water treatment 50 is a refugium). In one embodiment, the food is a finely chopped mix of several dried seaweeds, whole shrimp, whole marine fishes, whole octopus or squid, fresh blue-crab in shell, mussels or clams (shelled), and clam juice. Liquid vitamin supplements and also HUFA supplementation (Sel-Con) can also be added. The thoroughly mixed food is pressed about ½ inch thick onto flat trays, and then frozen. Frozen food is easily broken into chunks for feeding.

As discussed above, many life forms 252 require specific water conditions to thrive. For example, many types of coral require specific levels of calcium carbonate which is used by various life forms 252 to generate exoskeletons. Similarly, while many life forms 252 thrive in waters having specific contents of calcium carbonate they similarly can be destroyed by other types of impurities such as metal oxides or silica that may be found in the water. Thus, in many places in the world where contaminants are found in water supplies, it is necessary to use a reverse osmosis system to remove those impurities to prevent the contamination of habitat 10.

Habitat 10 described herein and agriculture systems 100, 110 and 120 have been successfully practiced without use of reverse osmosis utilizing tap water in Noblesville, Ind. It is believed that this has been successful due to the specific characteristics of the ground water available in this area. Indiana limestone is 97% calcium carbonate and only 1.7% silicon dioxide while limestone commonly found in other regions contain an average of 20-25% silica and may contain as low as 40% calcium carbonate. Silica is an adverse material in habitat 10 as it is known to foster nuisance algae, which can smother corals and other life forms 252. The ground water available in Noblesville, Ind. includes dissolved chemically pure limestone that has the high levels of calcium necessary to support the growth of life forms 252 such as coral that require high levels of calcium. Additionally, the water available in Noblesville, Ind., is naturally buffered at a high alkalinity and ph, and naturally contains iron and magnesium from Silurian dolomite bedrock prevalent in this area. This same Silurian dolomite bedroom may also contain trace minerals and elements that are beneficial to many species of coral. (Silurian dolomite includes fossilized Silurian reefs which may include many of the trace minerals and elements required by species currently living in reefs.)

In other embodiments of aquaculture systems 100, 110 and 120, it is possible to use reverse osmosis and to monitor and supplement calcium levels. There are many options available for this. Supplements come in various forms from powders, liquids and drips and even purposely built calcium reactors, which are all known in the art.

While several different methods for rotating or revolving rotating tray 20 have been described herein. There are a myriad of other possible means for generating rotational motion of rotating tray 20. For example, it is possible to provide a mechanical means located either near bushing 228 or near the periphery of tray 230 to generate mechanical rotation of rotating tray 20. Another possibility could be to provide motorized floats 242 that utilize either a jet of water or a prop like mechanism to generate a revolving motion of rotating tray 20. In this regard, any means that could be contemplated by one skilled in the art to revolve rotating tray 20 at speeds sufficient to provide the desired water flow characteristics to life forms 252 on tray 20 is contemplated herein.

Similarly, floats 240 are disclosed for regulating the depth of tray 20 and life forms 252 underwater. Once again, there are other possible means for regulating the depth of tray 20, including, but not limited to structural members on center support 212, either above and/or below, that limit the relative position of tray 20 on center support 212 (not illustrated). In other embodiments, the depth of tray 20 could be regulated by a structural member, such as a wheel, extending from the bottom of tray 20 to fill 16. Any other means known in the art to regulate the depth of a tray in water is contemplated herein.

Outlets 80, 82 and 84 are disclosed as means to generate water flows across life forms 252. Other embodiments can utilize other means to generate water flows known to those skilled in the art, including but not limited to propellers, venturi nozzles, water jets and water pumps.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:

1. A system for aquaculturing aquatic life forms comprising:
   a reservoir holding water;
   a tray holding the aquatic life forms submerged in said water, wherein said tray is rotatable within and with respect to said reservoir, wherein the tray defines a flat surface and wherein the aquatic life forms sit on the flat surface; and
   a means for rotating said tray in said reservoir, wherein the tray revolves about an axis of revolution and wherein the axis of revolution is perpendicular to the flat surface defined by the tray.

2. The system of claim 1, further comprising a first means to direct water flow across the aquatic life forms on said tray while said tray rotates.

3. The system of claim 2, further comprising a second means to direct water flow across the aquatic life forms on said tray, wherein said second means to direct water flow generates a flow of water different than that produced by said first means to direct water flow.

4. The system of claim 1, further comprising a plurality of buoyant floats for positioning under aquatic life forms on said tray.

5. The system of claim 1, further comprising a greenhouse containing said reservoir.

6. The system of claim 1, further comprising a means to regulate the depth of said tray under water when said tray is submerged in water.

7. The system of claim 6, wherein said means to regulate the depth of said tray under water comprises a float coupled to said tray by a connector.

8. The system of claim 1, wherein said means for rotating said tray is a means to direct water flow directed to impinge a flow of water upon said tray.

9. The system of claim 1, wherein aquatic life forms positioned on said tray experience water flow in at least two different directions relative to the aquatic life forms during one rotation of said tray when said tray is submerged under water.

10. The system of claim 1, wherein the position of said tray when said tray is submerged in water is adjustable.

11. The system of claim 1, wherein said tray is perforated.

12. The system of claim 11, further comprising an aerator positioned under said tray operable to produce a flow of air through said tray when said tray is submerged under water.

13. The system of claim 1, further comprising a refugium that utilizes macro-algae as a filtration medium.

14. The system of claim 13, further comprising:
   a reservoir outlet in said reservoir;
   a refugium outlet in said refugium;
   a spray bar in said refugium directed away from said refugium outlet;
   a water pump operably coupled between said reservoir outlet and said spray bar; and
   nozzle operably coupled to said refugium outlet, wherein said nozzle generates a flow of water across the aquatic life forms on said tray while said tray rotates.

15. The system of claim 1, further comprising:
   a first means to direct water flow across the top of said rotating tray in a first direction; and
   a second means to direct water flow across the top of said rotating tray substantially in said first direction;
   wherein aquatic life forms positioned on said tray experience water flow from said first and second means in different directions relative to the aquatic life forms during rotation of the tray in said reservoir.

16. The system of claim 1, wherein said reservoir holds ground water substantially unaltered, wherein the ground water includes calcium carbonate and less than 5 percent silica.

17. A method for aquaculture of an aquatic life form, the method comprising:
   submerging a flat tray in an aquatic habitat, wherein the flat tray defines a flat surface that the aquatic life form sits upon;
   continuously rotating the flat tray in the aquatic habitat about an axis of revolution, wherein the axis of revolution is perpendicular to the flat surface defined by the tray; and
   generating a first flow of water in the aquatic habitat that generates variable water flow conditions in the habitat so that the aquatic life form on the tray experiences water flow in at least two different directions relative to the aquatic life form during one rotation of the tray.

18. The method of claim 17, further comprising:
   generating a second flow of water in the habitat that further varies the variable water flow conditions in the habitat.

19. The method of claim 17, further comprising:
   impinging the first flow of water against the tray to revolve the tray in the habitat.

20. The method of claim 17, wherein the aquatic life form is continuously submerged under water in the aquatic habitat when continuously rotating the tray.

* * * * *

UNITED STATES PATENT AND TRADEMARK OFFICE
CERTIFICATE OF CORRECTION

PATENT NO. : 8,267,045 B2
APPLICATION NO. : 13/216586
DATED : September 18, 2012
INVENTOR(S) : Karen R. Spartz Page 1 of 1

It is certified that error appears in the above-identified patent and that said Letters Patent is hereby corrected as shown below:

In the Claims:

In column 14, line 24, insert --a-- before the word "nozzle."

Signed and Sealed this
Seventh Day of May, 2013

Teresa Stanek Rea
*Acting Director of the United States Patent and Trademark Office*